United States Patent [19]

Davis

[11] Patent Number: 5,499,009
[45] Date of Patent: Mar. 12, 1996

[54] LIGHT FLASHING SYSTEM

[75] Inventor: Kevin A. Davis, Brighton, Mich.

[73] Assignee: Microflash, Inc., Brighton, Mich.

[21] Appl. No.: 207,944

[22] Filed: Mar. 8, 1994

[51] Int. Cl.[6] .................................................... B60Q 1/00
[52] U.S. Cl. ........................ 340/468; 340/472; 340/475;
340/478; 340/479; 307/10.8
[58] Field of Search .................................... 340/468, 471,
340/472, 475, 478, 479; 307/10.8

[56]  References Cited

U.S. PATENT DOCUMENTS

| 3,735,196 | 5/1973 | Bolinger et al. | 340/468 |
| 4,306,218 | 12/1981 | Leconte et al. | 340/468 |
| 4,808,969 | 2/1989 | Human | 340/468 |
| 4,812,808 | 3/1989 | Ulrich | 340/468 |
| 5,296,840 | 3/1994 | Gieffers | 340/468 |
| 5,355,119 | 10/1994 | Pearlman | 340/468 |

Primary Examiner—John K. Peng
Assistant Examiner—Edward Lefkowitz
Attorney, Agent, or Firm—Gifford, Krass, Groh, Sprinkle, Patmore, Anderson & Citkowski

[57] ABSTRACT

A system for flashing a plurality of light sources, such as the headlights, taillights, brake lights and/or turn signal indicators of an automotive vehicle which includes a plurality of light switching circuits wherein one light switching circuit is associated with each light source. Each light switching circuit is responsive to a predetermined input signal to switch its associated light source between an on and an off condition. A microprocessor has a plurality of output signal lines wherein one output line is electrically connected with each light switching circuit. The microprocessor is preprogrammed to generate the predetermined input signals to the light switching circuits on its output signal lines in a predetermined sequence.

7 Claims, 2 Drawing Sheets

LIGHT FLASHING SYSTEM

BACKGROUND OF THE INVENTION

I. Field of the Invention

The present invention relates to a system for flashing a plurality of different light sources.

II. Description of the Prior Art

Many emergency vehicles, such as police cars, ambulances and the like, utilize light flashing circuitry in order to draw attention to the vehicle. The light flashing circuits typically flash the vehicles headlights turn signal lights, brake lights and/or running lights on the vehicle.

Furthermore, many users of emergency vehicles, such as police departments, have particular requirements for their light flashing circuitry utilized on the automotive vehicles. For example, some police departments prefer a wigwag light flashing of the headlights, i.e. the left and right headlight alternate in flashing while still other police departments prefer simultaneous flashing of both the left and right headlight. Still other police departments require even more complex sequencing of the light flashing. For example, a police department may prefer three wigwags of the headlights followed by simultaneous flashing of the left and right headlights.

There have been previously known circuits that are designed for use with emergency vehicles and which are electrically connected to the lights in order to flash the lights in a predetermined sequence. These previously known devices, however, have been constructed of discrete electronic components which are disadvantageous in a number of different respects.

First, constructing the light flashing circuit from discrete electronic components is not only time consuming, but also relatively expensive in both labor and material cost.

A still further disadvantage of these previously known light flashing circuits is that the sequence of flashing of the lights is accomplished by actually modifying the electronic circuit. Consequently, changing the sequence of the light flashing is not only difficult, but also time consuming. As a practical matter, these previously known light flashing units are only available in a limited number of different light flashing sequences.

SUMMARY OF THE PRESENT INVENTION

The present invention provides a system for flashing a plurality of light sources which overcomes all of the above mentioned disadvantages of the previously known devices.

In brief, the present invention comprises a plurality of light switching circuits wherein one light switching circuit is associated with each light source that is to be flashed. Such light sources can included, tier example, headlight, taillights, brake lights and turn signal lights of an automotive vehicle. Furthermore, each light flashing circuit is responsive to a predetermined input signal to switch its associated light source between an on and an off condition.

The system further comprises a microprocessor having a plurality of output signal lines wherein one output signal line is electrically connected with each light switching circuit. Read only memory (ROM) containing a computer program is then accessed by the microprocessor for generating the input signals to the light switching circuit in order to selectively activate, i.e. turn on and off, the light sources.

BRIEF DESCRIPTION OF THE DRAWING

A better understanding of the present invention will be had upon reference to the following detailed description when read in conjunction with the accompany drawing, wherein like reference characters refer to like parts throughout the several views, and in which.

DETAILED DESCRIPTION OF A PREFERRED EMBODIMENT OF THE PRESENT INVENTION

Figure 2:
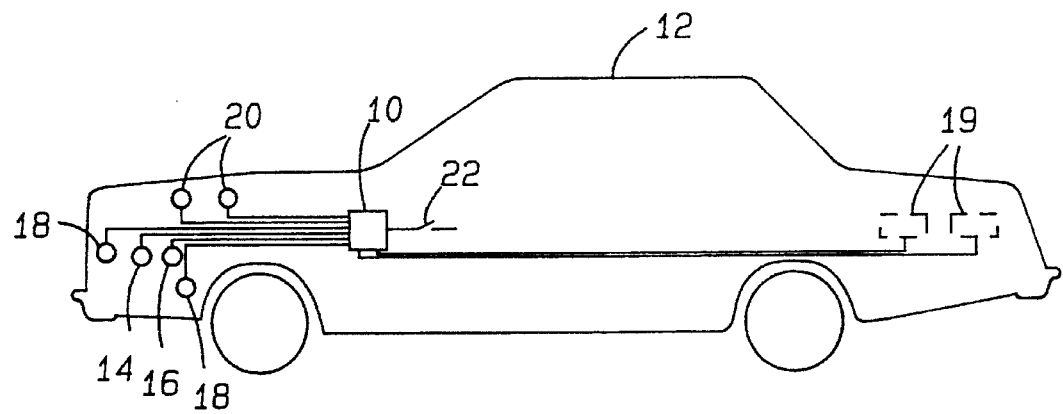
FIG. 2 is a diagrammatic view illustrating the light flashing system of the present invention installed on an automotive vehicle.

With reference first to FIG. 2, a diagrammatic view of the light switching system 10 of the present invention is thereshown installed in an automotive vehicle 12. The automotive vehicle 12 can, for example, comprise a police car having left and right head lights 14 and 16, respectively, turn signals 18 and emergency signals 20. The emergency signals 20 are typically blue or red lights and are mounted near the grill for the vehicle 12. In a fashion to be subsequently described, upon activation of the system 10 by a switch 22, the system 10 flashes the lights 14-20 in a predetermined sequence.

Figure 1:
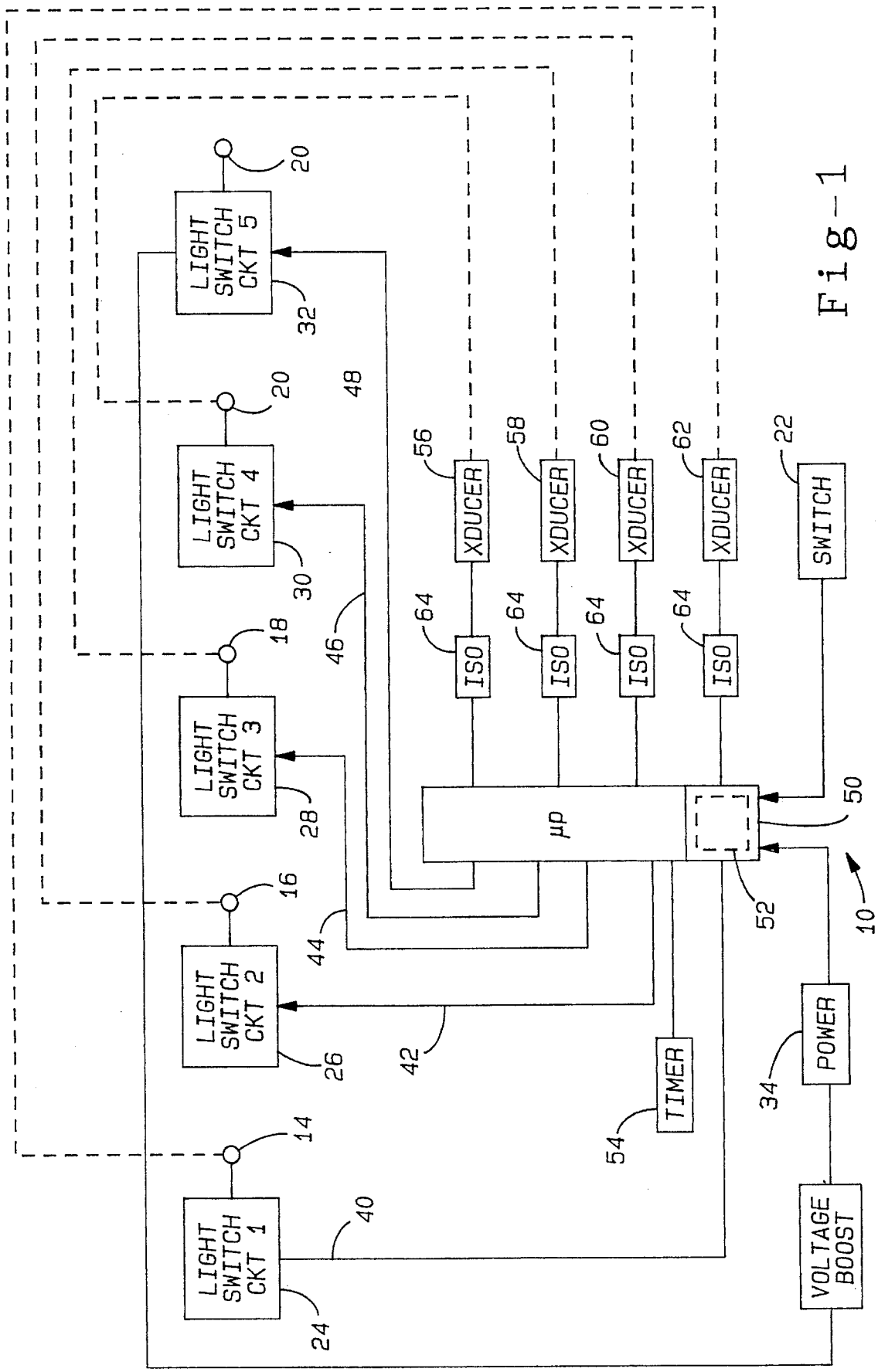
FIG. 1 is a block diagrammatic view illustrating a preferred embodiment of the present invention.

With reference now to FIG. 1 a block diagrammatic view of the system 10 of the present invention is thereshown and comprises a plurality of light switching circuits 24, 26, 28, 30 and 32 Each light switching circuit 24 is electrically connected in series between a source of power 34 and one of the lights 14-20 so that one light switching circuit 24-32 is associated with at least one light source 14-20. Furthermore, although five light switch circuits 24-32 are illustrated in FIG. 1, the system 10 can include fewer or more light switching circuits 24-32 without deviation from either spirit or the scope of the present invention.

In a fashion which will be subsequently described in greater detail, each light switching circuit 24-32 is responsive to a predetermined signal on its associated input line 40-48, respectively, for switching their associated light sources 14-20 between an on and an off condition. For example, a series of predetermined signals or pulses on line 40 will activate the light switching circuit 24 to flash the light source 14 with each signal pulse. Similarly, a predetermined series or pulses of the predetermined signal on the input line 44 to the light switching circuit 28 will flash the light source 18 and so on.

Still referring to FIG. 1 a microprocessor 50 has a plurality of outputs, each of which are connected to the input lines 40-48 to the light switching circuits 24-32. The microprocessor 50 operates in accordance with a computer program contained on read only memory (ROM) 52 The read only memory 52 is illustrated in FIG. 1 as contained on the microprocessor 50 itself, but, alternatively, can be contained in read only memory external to the microprocessor 50.

The microprocessor also receives a signal from a timer 54 as an input signal. The timer 54 is utilized by the microprocessor 50 to control both the duration and frequency of flashing of the various light sources 14-20.

The microprocessor 50 also receives as input signals the output signals from a plurality of transducers 56-62. These transducers 56-62 produce output signals indicative of various conditions of the lights. For example, the transducer 56 may indicate whether or not the headlights are on or off while the transducer 58 produces an output signal indicative of whether or not the high beams of the automotive front lights are on or off. Each transducer 56-62, furthermore, is coupled through an optical isolator 64 to protect the microprocessor 50 from power surges.

Figure 3:
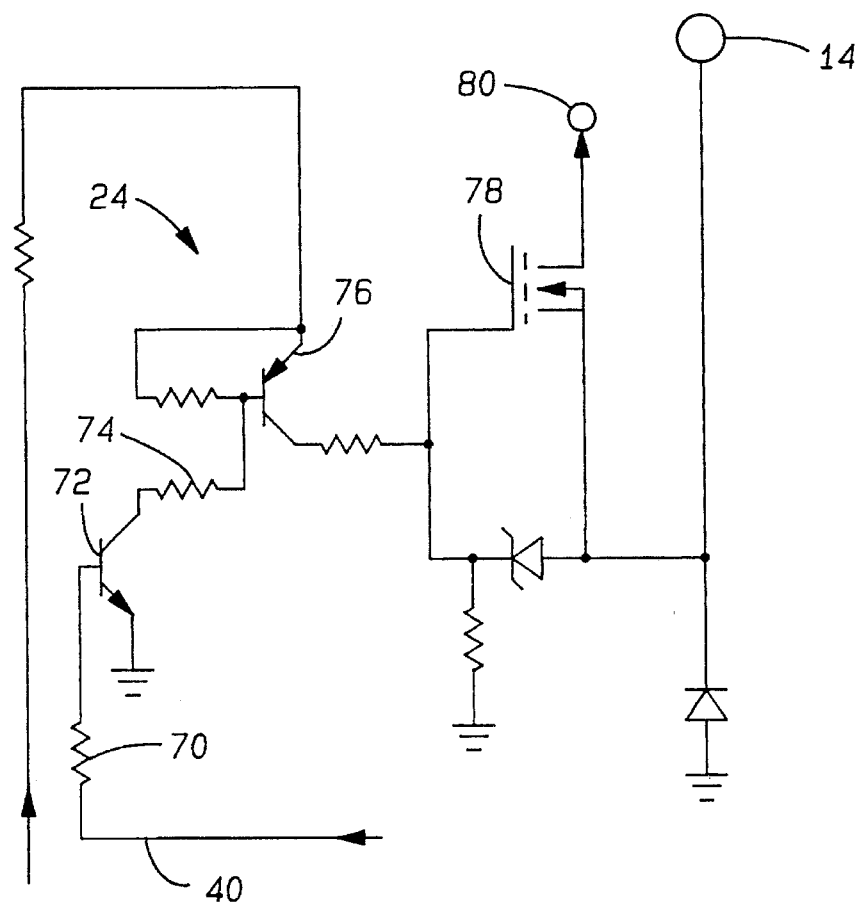
FIG. 3 is a schematic view of one light switching circuit.

With reference now to FIG. 3, one light switching circuit 24 is thereshown in greater detail. Although the following description pertains to the light switching circuit 24, it is equally explicable to the other light switching circuits 26-32.

The input line 42 the line switch circuit 24 is coupled through a resister 70 to the base of a first transistor 72. Thus, when the voltage level on the input line 40 exceeds a predetermined level, the transistor 72 turns on and conducts.

The collector of the transistor 72, in turn, is connected through a resister 74 to the base of a second transistor 76. Consequently, when the first transistor 72 conducts, it in turn turns on the second transistor 76 so that it conducts.

The emitter of the second transistor 76 is connected through a voltage multiplying circuit 78 (FIG. 1) to the power source 34. The voltage multiplying circuit 78 increases the power of the power source 34 (typically 12 volts) to a higher voltage such as 18 volts sufficient to switch a field effect transistor. The collector of the second transistor 76 is connected to the gate of a field effect transistor (FET) 78 so that, when the transistor 76 conducts, it turns on the FET 78.

The source and drain of the FET 78 are conducted in series between a source of power 80, typically 12 volts in an automotive system, and the light source 14.

In operation, a series of signals on the input line 42 the switching circuit 74 will cause all three transistors 72, 76 and the FET 78 to conduct and thus flash the light source 14 in accordance with the input signal. Since the switching circuit 24 utilizes solid state components, the switching of the light source 14 is not only rapidly, accurately and reliably obtained, but the switching is also accomplished with little heat generation.

In practice, the microprocessor 50 is programmed to generate output signals on the lines 40-48 to the light switching circuits 32 in order to flash light sources 14-20 in a predetermined sequence. Since this sequence can be easily modified by simply modifying the computer program, any desired flashing sequence for the light sources 14-20 can be obtained without modification of the overall circuitry.

From the forgoing, it can be seen that the present invention provides a simple, as inexpensive and yet highly reliable light flashing system. Although the light flashing system of the present invention is particularly advantageous for use with an automotive vehicle, such as a police car or an ambulance, it can also be used in other applications, such as signs, lighting displays and the like.

I claim:

1. A system for flashing a plurality of light sources comprising:

a plurality of light switching circuits, one light switching circuit being associated with each of said light sources and responsive to a predetermined input signal to switch its associated light source between an on and an off condition, a microprocessor having a plurality of output signal lines, each of said output signal lines being electrically connected with each light switching circuit, means for programming said microprocessor for generating said predetermined input signal on said output signal lines in a predetermined sequence, means tier determining the ON/OFF condition of at least one of said light sources and for generating a status signal representative thereof, and means for electrically coupling said ON/OFF condition signal as an input signal to said microprocessor, wherein said coupling means comprises an optical isolator.

2. The invention as defined in claim 1 wherein one of said light sources comprises a headlight of an automotive vehicle.

3. The invention as defined in claim 1 wherein one of said light sources comprises a brake light of an automotive vehicle.

4. The invention as defined in claim 1 wherein one of said light sources comprises a turn signal light of an automotive vehicle.

5. The invention as defined in claim 1 wherein each light switching circuit comprises a solid state switch electrically connected in series between its associated light source, and means responsive to said input signal for turning said solid state switch from a nonconductive state to a conductive state.

6. The invention as defined in claim 5 wherein said solid state switch is a field effect transistor.

7. The invention as defined in claim 6 wherein said turning means comprises a transistor having a base electrically connected to said predetermined input signal and a collector electrically connected to a gate of said field effect transistor.

* * * * *

UNITED STATES PATENT AND TRADEMARK OFFICE
CERTIFICATE OF CORRECTION

PATENT NO. : 5,499,009　　　　　　　　　　　　　　　Page 1 of 2
DATED : March 12, 1996
INVENTOR(S) : Kevin A. Davis It is certified that error appears in the above-indentified patent and that said Letters Patent is hereby corrected as shown below:

Column 1,　　line 13, after "headlights", insert --,--;

line 56, delete "tier" and insert --for--;

line 67, after "sources." insert the paragraph --Since the microprocessor can be programmed to flash the light sources in any desired sequence, only the computer program contained in the read only memory need to be varied in order to vary the light flash sequence for the automotive. This can be easily and rapidly accomplished.--.

UNITED STATES PATENT AND TRADEMARK OFFICE
CERTIFICATE OF CORRECTION

PATENT NO. : 5,499,009
DATED : March 12, 1996
INVENTOR(S) : Kevin A. Davis

It is certified that error appears in the above-indentified patent and that said Letters Patent is hereby corrected as shown below:

Column 4, line 3, after "like." insert the paragraph --Having described my invention, however, many modifications thereto will become apparent to those skilled in the art to which it pertains without deviation from the spirit of the invention as defined by the scope of the appended claims.--.

line 22, delete "tier" and insert --for--.

Signed and Sealed this

Second Day of July, 1996

BRUCE LEHMAN

*Attest:*

*Attesting Officer*  *Commissioner of Patents and Trademarks*